United States Patent
Kwon et al.

(10) Patent No.: US 11,463,934 B1
(45) Date of Patent: Oct. 4, 2022

(54) ZERO OVERHEAD ON-DEMAND MULTI/UNI-CASTING IN MANET

(71) Applicant: Rockwell Collins, Inc., Cedar Rapids, IA (US)

(72) Inventors: TJ T. Kwon, Marion, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 87 days.

(21) Appl. No.: 16/910,184

(22) Filed: Jun. 24, 2020

(51) Int. Cl.
*H04W 40/02* (2009.01)
*H04W 4/06* (2009.01)
*H04L 45/00* (2022.01)
*H04L 12/18* (2006.01)
*H04W 84/18* (2009.01)

(52) U.S. Cl.
CPC ............ *H04W 40/02* (2013.01); *H04L 45/32* (2013.01); *H04W 4/06* (2013.01); *H04L 12/189* (2013.01); *H04W 84/18* (2013.01)

(58) Field of Classification Search
CPC ........ H04L 12/189; H04L 45/32; H04W 4/06; H04W 40/02; H04W 84/18
See application file for complete search history.

(56) References Cited

U.S. PATENT DOCUMENTS

| 8,942,197 | B2 | 1/2015 | Rudnick et al. | |
| 10,477,543 | B2 | 11/2019 | Johnson et al. | |
| 10,999,778 | B1 * | 5/2021 | Kwon | H04W 80/02 |
| 2015/0043384 | A1 * | 2/2015 | Hui | H04W 40/246 370/255 |
| 2016/0094400 | A1 * | 3/2016 | Liang | H04L 49/70 370/254 |
| 2017/0041916 | A1 | 2/2017 | Soret et al. | |
| 2018/0026870 | A1 * | 1/2018 | Thubert | H04L 45/26 370/238 |
| 2019/0253951 | A1 * | 8/2019 | Di Marco | H04W 40/246 |

(Continued)

FOREIGN PATENT DOCUMENTS

WO 2019045767 A1 3/2019

OTHER PUBLICATIONS

U.S. Appl. No. 16/537,824, dated Aug. 12, 2019, Kwon et al.
(Continued)

*Primary Examiner* — Khaled M Kassim
*Assistant Examiner* — Kai Chang
(74) *Attorney, Agent, or Firm* — Suiter Swantz pc llo

(57) ABSTRACT

A multi-node communication network and method for sending data within a multi-node communication network are disclosed. The network includes a source communication node, a destination communication node, and one or more relay communication nodes. The communication nodes include a communication interface and a controller communicatively coupled to the communication interface configured to transmit, receive, or relay a data packet. The data packet includes a route request and a route request priority index, which is configured to provide a determining factor indicating that a route response may be combined with a position location transmission. Once received by the destination communication node, a route response may be combined with a PLI transmission and transmitted, depending on the indication by the route request priority index.

16 Claims, 8 Drawing Sheets

(56) References Cited

U.S. PATENT DOCUMENTS

| | | | |
|---|---|---|---|
| 2020/0092203 A1* | 3/2020 | di Marco | H04L 45/36 |
| 2020/0236607 A1* | 7/2020 | Zhu | H04W 24/08 |
| 2020/0374224 A1* | 11/2020 | Garcia-Luna-Aceves | H04L 45/42 |
| 2021/0211964 A1* | 7/2021 | Breitbach | H04W 84/18 |

OTHER PUBLICATIONS

U.S. Appl. No. 16/369,398, dated Mar. 29, 2019, Kwon et al.
U.S. Appl. No. 16/367,483, dated Mar. 28, 2019, Kwon et al.
Brand, Steven R. et al., "A Software Framework for Mobile Ad Hoc Data Communications Using Legacy Voice-Centric Tactical Radios", Proceedings of 2006 Command and Control Research and Technology Symposium, (San Diego, Jun. 2006), 21 pages.
Talarico, Salvatore et al., "Controlled Barrage Regions: Stochastic Modeling, Analysis, and Optimization", Cornell Univeristy, arXiv:1610.08173v2 [cs.IT] [Submitted on Oct. 26, 2016 (v1), last revised Nov. 7, 2016 (this version, v2)], 7 pages.
Wang, Uen-Tao, "Tactical Edge Network Social Routing (TENSR)", Technical Report #160006, University of California, https://arxiv.org/pdf/1705.02552, 17 pages.

\* cited by examiner

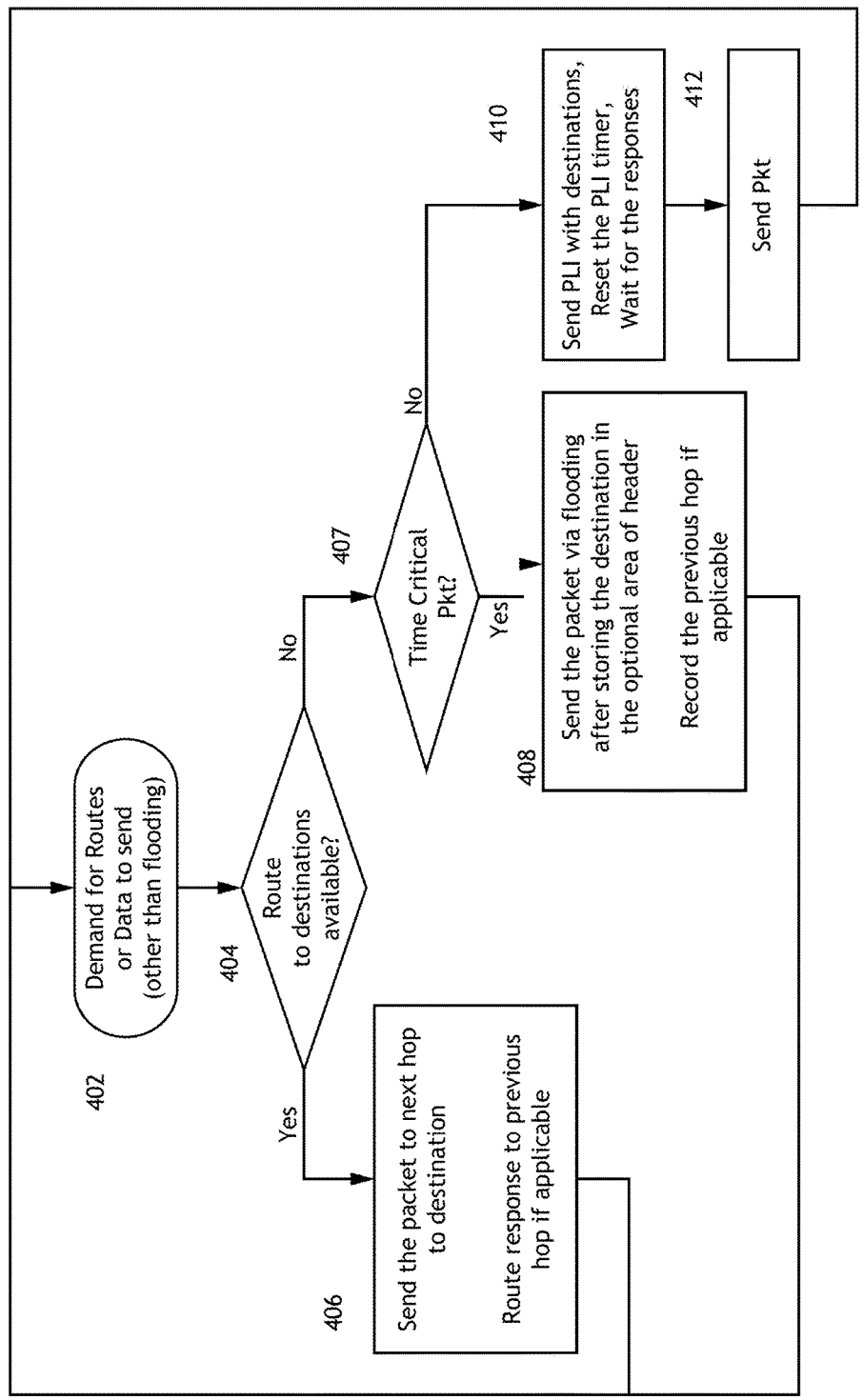

ZERO OVERHEAD ON-DEMAND MULTI/UNI-CASTING IN MANET

BACKGROUND

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Currently, packet flooding is one of the only techniques which may be used to deliver a data packet to a particular destination without knowing the route or network topology. There are several types of flooding including blind flooding, multi-point relay (MPR), efficient flooding with passive clustering (EFPC), Zero Overhead Efficient Flooding (ZOEF), and flooding to routing (F2R).

MANET often suffers from high routing control overhead when the channel quality degrades or when the bandwidth is limited. Route requests and route responses sent via flooding protocols further reduce available bandwidth and may delay communication of time critical data. Therefore, it would be desirable to provide a system and method that cure one or more of the shortfalls of the previous approaches identified above.

SUMMARY

A multi-node communication network is disclosed. In embodiments, the network includes a source communication node. The source communication node includes a first communication interface and a first controller communicatively coupled to the first communication interface. The first controller is configured to transmit a data packet. The data packet includes a route request and a route request priority index. The route request priority index is configured to provide a determining factor indicating that a route response may be combined with a position location information (PLI) transmission. In embodiments, the network includes a destination communication node. The destination communication node includes a second communication interface and a second controller. The second controller is communicatively coupled to the second communication interface. The second controller is configured to receive the data packet. The second controller is also configured to review the route request priority index to determine if the route response may be combined with a PLI transmission. The second controller is also configured to transmit a route response via the second communication interface to the source communication node, wherein the response is combined with a PLI transmission upon an indication by the route request priority index. In embodiments, the network further includes one or more relay communication nodes. The one or more relay communication nodes include a third communication interface and a third controller. The third controller is communicatively coupled to the third communication interface. The third controller is configured to relay data packets between the source communication node and destination communication node.

In some embodiments of the multi-node communication network, the route response is combined with the PLI transmission upon the indication by the route request priority index if the route request priority index indicates that the route response is time critical.

In some embodiments of the multi-node communication network, the route request priority index is a one-bit flag.

In some embodiments of the multi-node communication network, the route request is combined with a PLI transmission.

In some embodiments of the multi-node communication network, the second controller is further configured to store a routing table in a memory associated with a route.

In some embodiments of the multi-node communication network, the multi-node communication network further includes a memory configured to store a local list of one or more relay communication nodes communicatively coupled to the multi-node communication network.

In some embodiments of the multi-node communication network, the route response combined with the PLI transmission is transmitted via a packet flooding procedure.

In some embodiments of the multi-node communication network, the one or more relay communication nodes may combine a PLI transmission with at least one of the route request or the route response.

A method for transmitting data within a multi-node communication network is also disclosed. In embodiments, the method includes transmitting a data packet from a source communication node of a multi-node communication network to a destination communication node. The data packet includes a route request and a route request priority index. The route request priority index is configured to provide a determining factor indicating that a route response may be combined with a scheduled position location information (PLI) transmission. The method further includes receiving the transmitted data packet transmitted along a route including one or more relay communication nodes with the destination communication node. The method further includes reviewing the route request priority index to determine if the route response may be combined with a scheduled PLI transmission. The method further includes transmitting a route response from the destination communication node to the source communication node; wherein the route response is combined with a scheduled PLI transmission upon the indication by the route request priority index.

In some embodiments of the method, the route response is combined with a PLI transmission upon the indication by the route request priority index if the route request priority index indicates that the route response is time critical.

In some embodiments of the method, the route request priority index is a one-bit flag.

In some embodiments of the method, the route request is combined with a PLI.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4 illustrates a flowchart of a method for transmitting data within a multi-node communication network, in accordance with one or more embodiments of the present disclosure.

DETAILED DESCRIPTION

Figure 1:
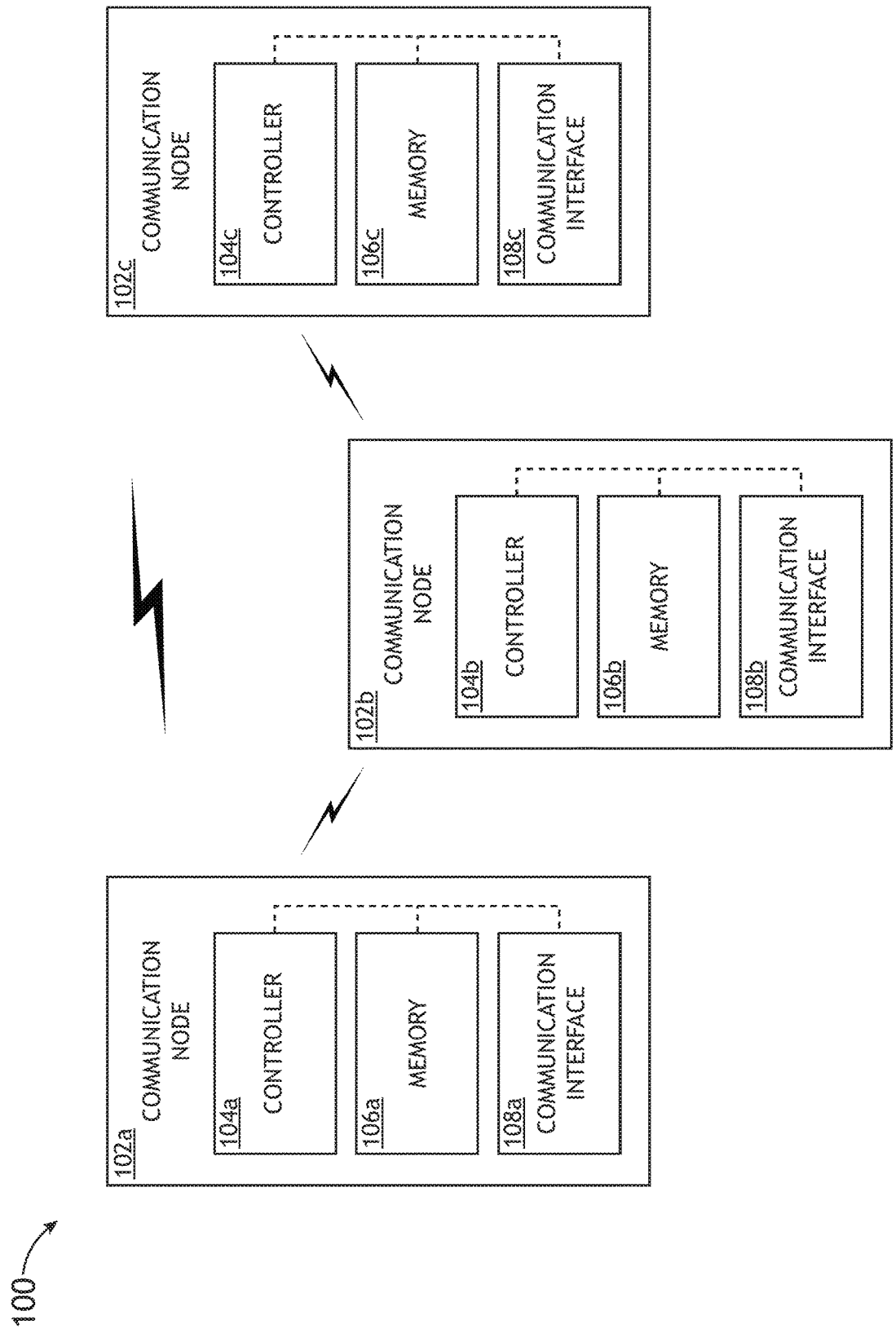
FIG. 1 illustrates a multi-node communication network, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1 b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like. If the route or network topology of the MANET is known, packets may be sent through unicast (e.g., point-to-point) or multicast techniques.

Currently, packet flooding is one of the only techniques which may be used to deliver a data packet to a particular destination without knowing the route or network topology. Packet flooding typically involves transmitting short "route-request" packets and/or" topology control" messages throughout the nodes of the network in order to discover network topology and/or advertise local link status throughout the network. The link status is discovered by exchanging "Hello" messages, also known as beacons. Destination nodes that receive the route request then reply with a route response, which is then relayed back to the originating node.

MANET nodes are also often required to send Position Location Information (PLI) data packets at specific intervals to other nodes within the network. PLI data includes coordinates for the node as well as other node characteristics. Scheduled PLI transmission ensures tracking of a node by all other nodes in the network. PLI is also sent as a part of Situation Awareness (SA) or Common Operating Picture (COP) updates. Flooding techniques are often used to send PLI packets from one node to all nodes in the system. Control of PLI transmissions, as well as route request/reply transmissions, can be cumbersome when bandwidth is limited or when channel quality degrades. These transmissions are integral to the maintenance of the network and help to ensure the safety of those using the network, as channel quality, channel congestion, and network topology may constantly change within a MANET.

Accordingly, embodiments of the present disclosure are directed to a system and method which cure one or more of the shortfalls of the previous approaches identified above.

Embodiments of the present disclosure are directed to a system and method of combining PLI transmissions with route request/response transmissions. In particular, a response request sent to a destination node may further include an extra code segment (e.g., a one-bit flag) that will indicate to the destination node whether a route response may be sent combined with the scheduled PLI transmission, or whether the route response is to be sent immediately.

It is contemplated herein that combining route responses with PLI transmissions will reduce congestion within the network. It is also contemplated herein that the approach may be used in both multicasting and unicasting situations. In this manner, this zero-overhead on-demand multi/unicasting (ZOOM) approach maximizes the use of existing traffic for route maintenance.

FIG. 1 illustrates a multi-node communication network 100, in accordance with one or more embodiments of the present disclosure. In embodiments, the multi-node communication network 100 may include a plurality of communication nodes 102. For example, the multi-node communication network 100 may include a first communication node 102a, a second communication node 102b, and a third communication node 102c.

The multi-node communication network 100 may include any multi-node communication network known in the art. For example, the multi-node communication network 100 may include a mobile ad-hoc network (MANET) in which each communication node 102 within the multi-node communication network is able to move freely and independently. Similarly, the one or more communication nodes 102 may include any communication node known in the art which may be communicatively coupled. In this regard, the one or more communication nodes 102 may include any communication node known in the art for transmitting/ transceiving data packets. For example, the one or more communication nodes 102 may include, but are not limited to, radios, mobile phones, smart phones, tablets, smart watches, laptops, and the like.

Each communication node 102 of the one or more communication nodes 102a, 102b, 102c may include, but is not limited to, a respective controller 104 (e.g., controller 104a, 104b, 104c, etc.), memory 106 (e.g., memory 106a, 106b, 106c, etc.), and communication interface 108 (e.g., communication interface 108a, 108b, 108c, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/ controller 104, such as software programs and/or code segments, or other data to instruct the controller 104, and possibly other components of the communication node 102, to perform the functionality described herein. For example, the memory 106 may be configured to store a local list of one or more nodes (e.g., locations or addresses). Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques known in the art including, but not limited to, GSM, GPRS, CDMA, EV-DO, EDGE, WiMAX, 3G, 4G, 4G LTE, 5G, WiFi protocols, radio frequency (RF), LoRa, and the like.

Figure 3A:
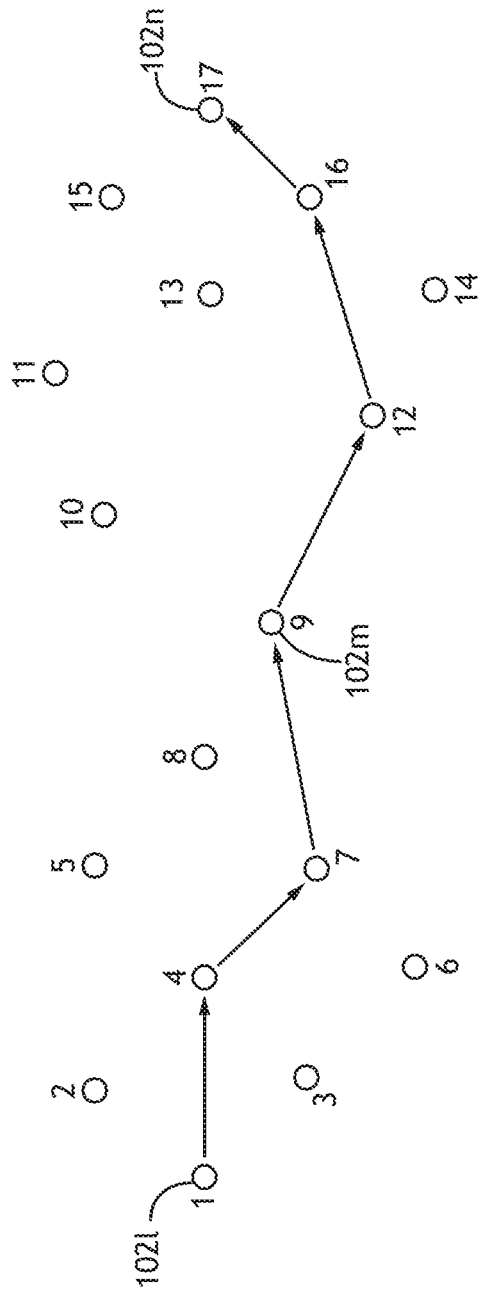
FIG. 3A illustrates a route response transmitted through a multi-node communication network along a discovered route, in accordance with one or more embodiments of the present disclosure.

In embodiments, the controller 104 of a communication node 102 is configured to carry out various steps and functions of the present disclosure. The controller 104 may be configured to: receive a data packet, via the communication interface 108, transmitted from a source communication node 102l to a destination communication node 102n (e.g., as shown in FIG. 3A); transmit the data packet, via the communication interface 108, to one or more relay communication nodes 102m via a packet flooding procedure; receive a route response, a PLI transmission and/or a combined route response and PLI transmission, via the communication interface 108, transmitted from the destination communication node 102n to the source communication node 102l along a discovered route; relay an additional data packet transmitted from the source communication node 102l to the destination communication node 102n along the discovered route; determine a route failure of the transmitted additional data packet; re-transmit, via the communication interface 108, the additional data packet to one or more relay communication nodes 102m of the multi-node communication network 100 via a packet flooding procedure; receive an additional route response acknowledgment, via the communication interface 108, transmitted from the destination communication node 102n to the source communication node 102l along a recovered route; and transmit the additional data packet, via the communication interface 108, to the destination communication node 102n along the recovered route.

In embodiments, the communication node 102 is configured as a source communication node 102l. The controller 104 of a communication node 102 configured as a source communication node 102l may be configured to transmit a data packet, via the communication interface 108 to a communication node 102; transmit, via the communication interface 108, a route response to a communication node 102; receive a route response, a PLI transmission, and/or a combined first route acknowledgement and PLI transmission via the communication interface 108 transmitted from a communication node 102. Route requests and route responses may contain several types of information including but not limited to a route request identification number, a destination communication node address, a path cost field (i.e., a metric for measuring the quality of a route), and a source communication node address. In embodiments, the source communication node 102l may send a route request combined with a PLI transmission.

In embodiments, the communication node 102 is configured as a destination communication node. The controller 104 of a communication node configured as a destination communication node may be configured to receive, via the communication interface 108, a first route request transmitted from a source communication node; combine a route response with a PLI transmission; transmit to a communication node 102 (e.g., a source communication node 102l or relay communication node 102m), via the communication interface 108 a route response, a PLI transmission, and/or a combined PLI transmission and route response.

Figure 2:
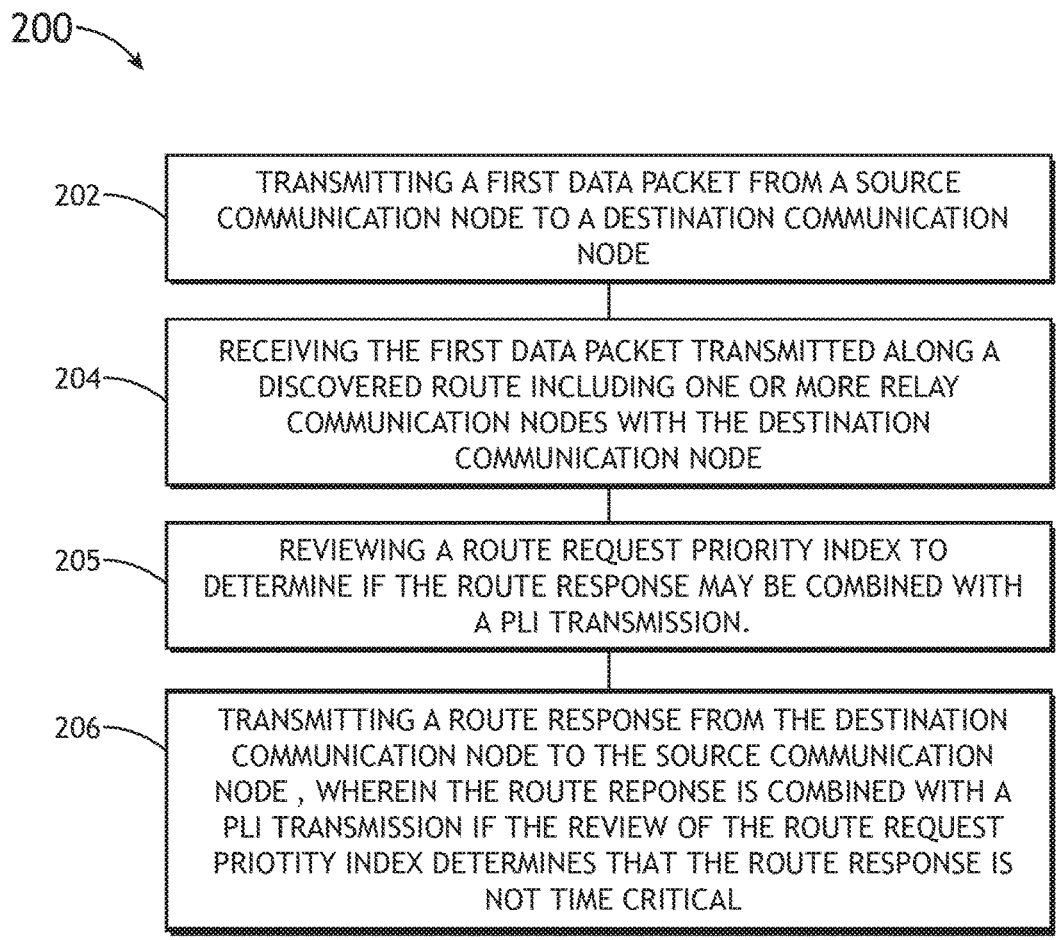
FIG. 2 illustrates a flowchart of a method for transmitting data within a multi-node communication network, in accordance with one or more embodiments of the present disclosure.

Each of these steps carried out by the controller 104 of a communication node 102 of the multi-node communication network 100 may be further shown and understood with reference to FIG. 2.

FIG. 2 illustrates a flowchart of a method 200 for transmitting data within a multi-node communication network 100 that also comprises combining a route response with a PLI transmission, in accordance with one or more embodiments of the present disclosure. It is noted herein that the steps of method 200 may be implemented all or in part by multi-node communication network 100. It is further recognized, however, that the method 200 is not limited to the multi-node communication network 100 in that additional or alternative system-level embodiments may carry out all or part of the steps of method 200.

In a step 202, a data packet is transmitted from a source communication node 102l of a multi-node communication network 100 to a destination communication node 102n, wherein the data packet comprises a route request and a route request priority index. For example, if the routing destinations are known and available (e.g., discovered), the data packets may be sent via a conventional routing protocol. This may be further understood with reference to FIG. 3A.

FIG. 3A illustrates a route response transmitted through a multi-node communication network 100 along a discovered route, in accordance with one or more embodiments of the present disclosure. As shown in FIG. 3A, the destination communication node 102n may receive a copy of a data packet via the discovered route including one or more relay communication nodes 102m of the multi-node communication network 100.

Figure 3B:
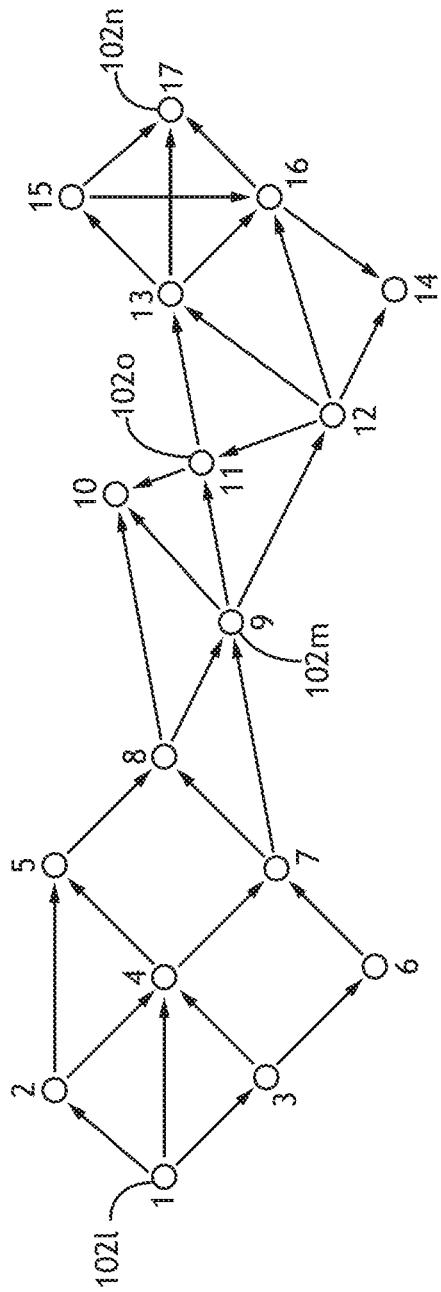
FIG. 3B illustrates a data packet transmitted through a multi-node communication network via a packet flooding procedure, in accordance with one or more embodiments of the present disclosure.

In another example, if the routing destinations are not discovered a packet flooding procedure may be utilized. FIG. 3B illustrates a data packet transmitted through a multi-node communication network 100 via a packet flooding procedure, in accordance with one or more embodiments of the present disclosure. In particular, FIG. 3B illustrates a data packet transmitted from a source communication node 102l of a multi-node communication network 100 to a destination communication node 102n via a packet flooding procedure.

In embodiments, the data packet is transmitted through the multi-node communication network 100 via a packet flooding procedure, in which each communication node 102 is configured to receive the data packet and relay the data packet to other communication nodes 102 within the multi-node communication network 100. In this regard, relay communication nodes 102m, 102o may be configured to receive a data packet and relay (e.g., transmit) the data packet to one or more communication nodes 102 within the multi-node communication network 100 via a packet flooding procedure. For the purposes of the present disclosure, the term "relay communication node 102" may be used to refer to one or more communication nodes 102 between the source communication node 102l and the destination communication node 102n.

In embodiments, the data packet may include a source address and/or a destination address within the header of the data packet in order to facilitate routing (e.g., unicasting, multicasting, anycasting) for purposes of flooding. For example, the data packet may include a source address indicating the data packet originates from the source communication node 102l, and a destination address (e.g., unicast, multicast, and/or anycast address) indicating the data packet is intended to be delivered to the destination communication node 102n. For example, a data packet may be transmitted from the source communication node to the destination communication node via at least one of a unicast or multicast method if the route is known. It is contemplated herein that source/destination addresses may include any unique identifier configured to identify a communication node 102 of the multi-node communication network including, but not limited to, MAC address, IP address, a single byte address, and the like. It is noted herein that transmitting the data packet via a packet flooding procedure may enable the data packet to be transmitted without any data regarding the topology of the multi-node communication network 100 and intermediate relay communication nodes 102. For example, a data packet may be transmitted from the source communication node 102l to the destination communication node 102n via a flooding procedure if the route is not known. In embodiments, the data packet may include a code segment (e.g., a one-bit flag) within the header of the data indicating the time-critical nature of the packet.

In embodiments, each communication node 102 of the multi-node communication network 100 is configured to implement data packet bookkeeping in order to facilitate packet flooding. For example, each communication node 102 may be configured to add a unique identifier (e.g., MAC address, IP address, and the like) to the header of the data packet upon relaying the data packet in order to indicate the data packet was transmitted through the respective communication node 102. In this regard, data packets arriving at the destination communication node 102n may include identifying data in the header of the data packet indicating the number of communication nodes 102 each respective data packet was transmitted through from the source communication node 102*l* to the destination communication node 102*n* (e.g., a "hop count"). In embodiments, the controller 104 of each communication node 102 is configured to identify a time-stamp of each received and/or transmitted data packet, and store the time-stamps in memory 106.

It is further noted that data packets may be transmitted through the multi-node communication network 100 using any efficient packet flooding procedure known in the art. For example, data packets may be transmitted through the aforementioned Flooding to Routing (F2R) method. F2R is described in further detail in U.S. patent application Ser. No. 16/537,824, filed Aug. 12, 2019, entitled FLOODING TO ROUTING, which is incorporated herein by reference in the entirety. By way of another example, data packets may be transmitted through the multi-node communication network 100 utilizing efficient flooding with passive clustering (EFPC). By way of another example, data packets may be transmitted via zero-overhead efficient flooding (ZOEF). ZOEF is described in further detail in U.S. patent application Ser. No. 16/369,398, filed Mar. 29, 2019, entitled ZERO-OVERHEAD EFFICIENT FLOODING, which is incorporated herein by reference in the entirety.

In embodiments, the data packets transmitted through the multi-node communication network 100 may include a data packet of a larger data transmission to be transmitted from the source communication node 102*l* to the destination communication node 102*n*. In other words, a data packet transmitted via a packet flooding procedure may include a fragmented internet protocol (IP) payload of a larger data transmission. In embodiments, a data transmission between the source communication node 102*l* to the destination communication node 102*n* may be broken up into data packets of equal (or substantially equal) size, such that a data packet is equal, or substantially equal, in size to subsequently transmitted data packets.

Accordingly, instead of utilizing traditional route-request packets and/or "hello" messages, the multi-node communication network 100 may utilize data packets of a larger data transmission in order to perform route discovery. In this regard, data packets of a data transmission may be transmitted via a flooding procedure as an implicit route request. By transmitting actual data packets of a data transmission in lieu of route-request topology-learning packets, the multi-node communication network 100 may enable more efficient network topography learning, eliminate initial route discovery/topology learning delay, and reduce route failure rate. For example, routes discovered with "short" route-request packets or "Hello" messages may not be suitable and/or appropriate to route actual data packets of a data transmission, which may be substantially longer than the short route-request packets or "Hello" messages. Thus, the longer data packets may experience additional route failures on top of route failures attributable to network topology changes. In particular, by transmitting a data packets which are approximately equivalent in size to other data packets of the data transmission to be sent, embodiments of the present disclosure may ensure discovered paths are suitable and/or appropriate for subsequent data packets to be transmitted.

It is contemplated herein that various flooding concepts and protocols may be utilized in order to optimize the packet flooding procedures used throughout the present disclosure to improve performance and reliability. For example, smart frame error recovery (SFER) and passive packet cross check (PPCC) concepts may be implemented during the packet flooding procedure in step 202. SFER is described in further detail in U.S. patent application Ser. No. 16/367,483, filed Mar. 28, 2019, entitled DATA FRAME ERROR RECOVERY FOR MULTI-NODE SYSTEMS, which is incorporated herein by reference in the entirety.

It is further contemplated herein that characteristics of the packet flooding procedure may be adaptively modified/adjusted based on one or more characteristics of the multi-node communication network 100 and the concept of operations (CONOPS). For example, the controller 104 of the source communication node 102*l* may determine the maximum transmission unit (MTU) of the multi-node communication network 100 and the size of the data packet transmitted in step 202 based on the quality and congestion of the multi-node communication network 100. For instance, the controller 104 of the source communication node 102*l* may be configured to fragment a data transmission in to one or more data payloads (e.g., data packets) such that each data packet is less than or equal to the MTU of the multi-node communication network 100.

In a step 204, the data packet is received by the destination communication node 102*n*, wherein the data packet was transmitted along a discovered route including one or more relay communication nodes 102. This may be further understood with reference to FIG. 3A.

In a step 205, the route request priority index is reviewed to determine if the route response may be combined with a scheduled PLI transmission. For example, if the route request priority index indicates that the route response is required immediately (e.g., a time-critical packet), then the route request response may be transmitted immediately using either a conventional routing protocol or a flooding protocol. In another example, if the request index indicates that the route response is not required immediately, then the route response may be transmitted when at the next scheduled PLI transmission (e.g., the route response is combined with the PLI transmission).

In a step 206, a route response is transmitted from the destination communication node 102*n* to the source communication node 102*l*, wherein the route response is combined with a PLI transmission as determined by the review of the route request priority index. For example, upon a destination communication node 102*n* receiving a data packet transmitted from the source communication node 102*l*, if the review of the route request priority index determines that the route response is time critical, the destination communication node 102*n* may transmit a route response to the source communication node 102*l*, immediately (e.g., the route response is not combined with a PLI transmission. The destination and relay communication nodes 102*n*, 102*m* may be configured to store a routing table in memory 106 associated with a route taken by the received data packet. The controller 104*n* of the destination communication node 102*n* may be further configured to time-stamp the stored routing table.

In this regard, the destination communication node 102*n* may transmit a route response to the source communication node 102*l* via one or more relay communication nodes 102 along the discovered route via a point-to-point communication (e.g., unicast). Similarly, each relay communication node 102 along the discovered route may be configured to receive the route response and relay (e.g., transmit) the route response along the discovered route to the source communication node 102*l*. In embodiments, the controller 104*n* of the destination and relay communication nodes 102*n*, 102*m* may be configured to store a routing table associated with the identified discovered route in memory 106. Moreover, the route response may include information associated with a destination address of the destination communication node 102n as well as an address of the sender of the route response, which may be different from the destination communication node 102n, as will be described in further detail herein.

For transmissions that are not time critical (e.g., as in step 206), as indicated by the route request priority index, the route response may be transmitted by the destination node at the next scheduled PLI transmission. For the combined route response and transmissions is then sent via flooding protocols ensuring that each communication node 102 within the network receives the PLI of the destination communication node 102n and that the source communication node 102l also receives the route response from the destination node 102n. Thus, by combining the route response with the PLI transmission, the source communication node 102l will receive the route response from the destination communication node 102n. In this manner, the route response is received by the source communication node 102l in a zero-overhead manner.

FIG. 4 illustrates a flowchart of a method 400 for transmitting data (e.g., a route request) within a multi-node communication network 100, in accordance with one or more embodiments of the present disclosure. It is noted herein that the steps of method 400 may be implemented all or in part by multi-node communication network 100 and/or method 200. It is further recognized, however, that the method 400 is not limited to the multi-node communication network 100 and/or method 200 in that additional or alternative system-level embodiments may carry out all or part of the steps of method 400.

In a step 402, a communication node 102 of a multi-node communication network 100 identities a data packet (e.g., a route request) which is to be transmitted and/or relayed. For example, as shown in FIG. 3A, a relay communication node 102m may receive a data packet transmitted from the source communication node 102l. The relay communication node 102m may identify the data packet as being needed to be relayed to the destination communication node 102n via a destination address in a header of the data packet.

In a step 404, the communication node 102 determines whether there is an available route to the destination communication node 102n. For example, the controller 104m of the relay communication node 102m may determine whether there is a routing table stored in memory 106m associated with a discovered route to the destination communication node 102n.

If there is an available route to the destination communication node 102n (Step 404="Yes"), method 400 may proceed to a step 406. In a step 406, the communication node 102 transmits the data packet to the next hop along the route to the destination. The communication node 102 may further transmit a route response to the previous hop (e.g., previous communication node 102), if applicable. For example, the relay communication node 102m may transmit the data packet to the relay communication node 102o along the discovered route from the source communication node 102l to the destination communication node 102n.

If there is no available and/or fresh route to the destination communication node 102n in step 404 (Step 404="No"), the method 400 may proceed to a step 407. In a step 407, the communication node 102 determines if the packet to be sent is a time-critical packet (e.g., the packet must be sent immediately). The time-critical nature of the packet may be indicated by a value provided by code segment (e.g., a one-bit flag). For example, a value of one (e.g., "1") may indicate that the packet is a time-critical packet and that a route response must be sent as soon as possible. In another example, a value of zero e.g., "0") may indicate that the packet is not critical, and that the route response may be delayed. For instance, the route response may be transmitted as a transmission that is coupled (e.g., piggybacked) to a PLI transmission.

If step 407 determines that that the packet is time-critical (e.g., Step 407="yes"), then the method 400 may proceed to a step 408. In a step 408, the communication node 102 transmits the data packet to one or more communication nodes 102 of the multi-node communication network 100 via a packet flooding procedure (e.g., P2R) after storing the destination address of the destination communication node 102n in the header of the data packet. In addition to transmitting the data packet via a packet flooding procedure, the communication node 102 may further be configured to record the previous hop (e.g., previous communication node 102) by updating a routing table to the source communication node 102l in memory 106 and add a unique identifier associated with the communication node 102 in the header of the data packet in order to implement flooding with bookkeeping. For example, the relay communication node 102m may transmit the data packet to one or more communication nodes 102 via a packet flooding procedure in order to recover a route from the relay communication node 102m to the destination communication node 102n. The one or more communication nodes 102 may further be configured to relay the received data packet via a packet flooding procedure to the destination communication node 102n.

If step 407 determines that that the packet is not time-critical (e.g., Step 407="No"), then the method 400 may proceed to a step 410. In a step 410, the communication node 102 delays the route response until the next scheduled PLI is to be sent; combines the route response with the schedules PLI transmission; then transmits the data packet to one or more communication nodes 102 of the multi-node communication network 100 via a packet flooding procedure after storing the destination address of the destination communication node 102n in the header of the data packet. The communication node 102 may then reset the PLI timer.

Similar to In step 408, the communication node of step 410 may further be configured to record the previous hop (e.g., previous communication node 102) by updating a routing table to the source communication node 102l in memory 106 and add a unique identifier associated with the communication node 102 in the header of the data packet in order to implement flooding with bookkeeping. The one or more communication nodes 102 may further be configured to relay the received data packet via a packet flooding procedure to the destination communication node 102n. After the PLI packet has been sent, the method 400 may proceed to a step 412 of transmitting other data packets to the next communication node 102.

Figure 5A:
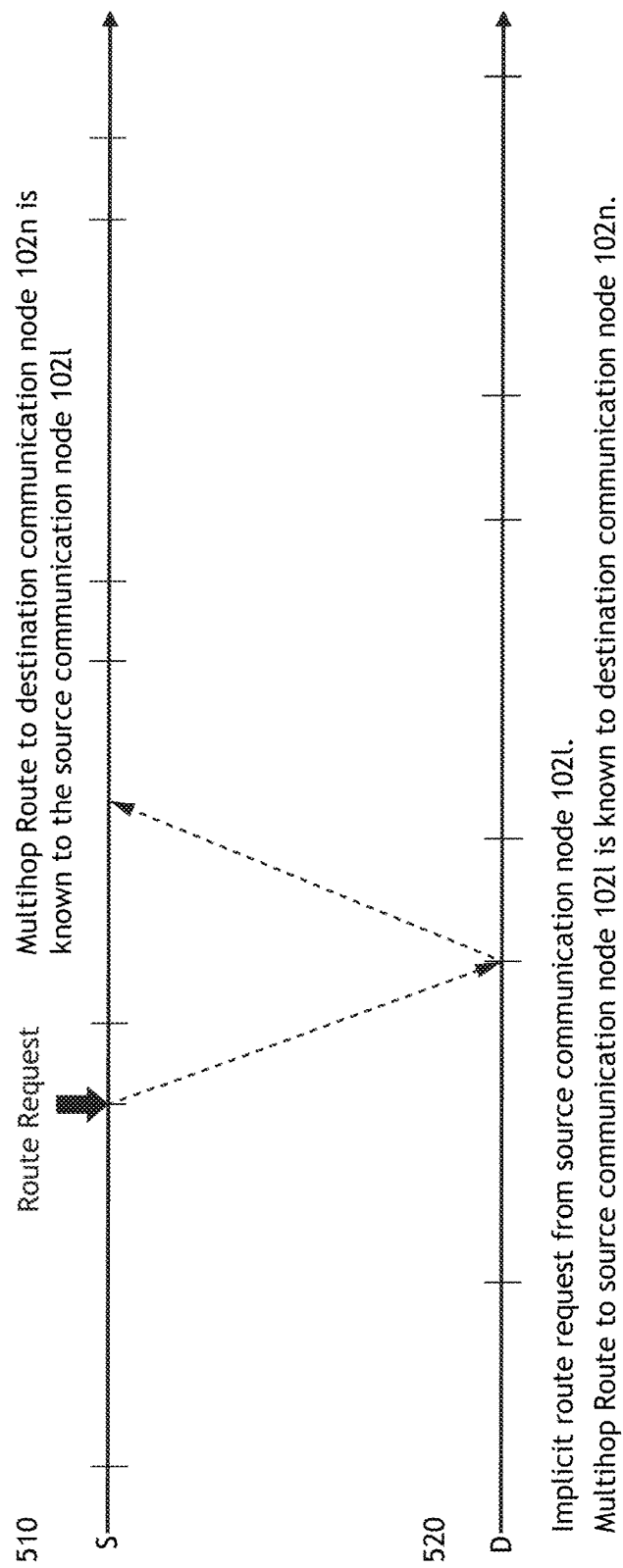
FIG. 5A illustrates a diagram of a timeline for data packet transmissions between a source communication node and a destination communication node, in accordance with one or more embodiments of the present disclosure.
Figure 5B:
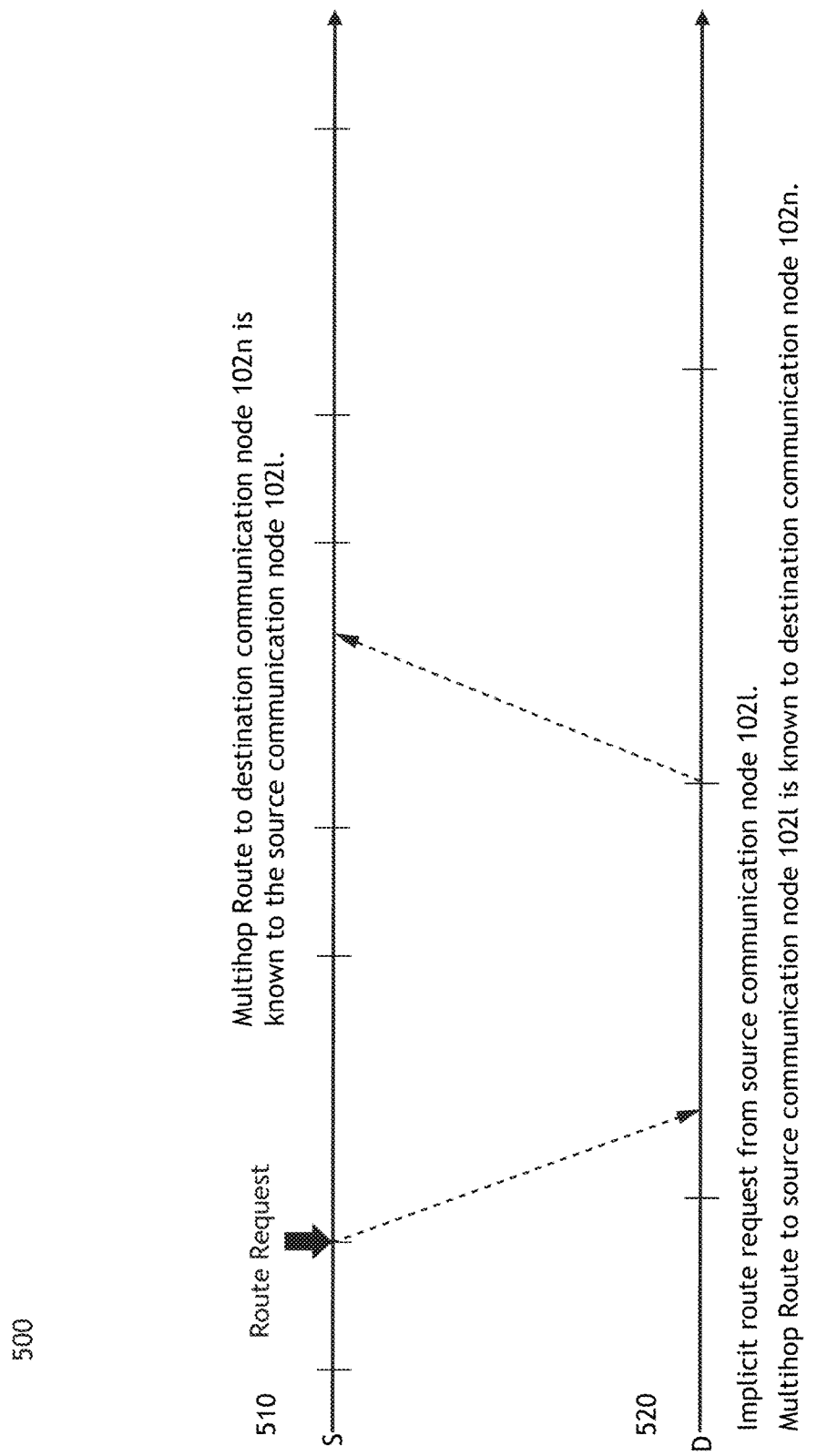
FIG. 5B illustrates a diagram of a timeline for data packet transmissions between a source communication node and a destination communication node, in accordance with one or more embodiments of the present disclosure.

FIGS. 5A and 5B are diagrams illustrating parallel timelines 500 of route request/responses for a multi-node communication network 100, in accordance with one or more embodiments of the present disclosure. For example, 5A illustrates parallel timelines 500 for a route reply/response wherein the packet is time critical (e.g., as indicated by the route request priority index). In this example, the multihop route from the source communication node 102l to the destination communication node 102n is known. Also, in this example, a source node timeline 510 for the source communication node 102l is designated by an "S", and a destination node timeline 520 for the destination communication node 102n is designated by a "D". In this example, the route request transmitted by the source communication node 102*l* is received by the destination communication node 102*n*, which then immediately sends a route response back to the source communication node 102*l* via the multihop route, which timely receives it. Because the route request is time critical, the route response was not combined with a scheduled PLI transmission. However, if the route response and the scheduled PLI transmission are to be transmitted at relatively the same time, then the route response and the PLI transmission may be combined. Therefore, the above description should not be interpreted as a limitation, but rather merely as an illustration.

In another example, 5B illustrates parallel timelines 500 for a route request/response wherein the packet is not time critical, as indicated by the route request priority index. As in the previous example, the multihop route from the source communication node 102*l* to the destination communication node 102*n* is known. In this example, the route request transmitted by the source communication node 102*l* is received by the destination communication node 102*n*. The destination communication node 102*n* then delays sending the route response until there is a scheduled PLI transmission for the destination communication node 102*n*. The destination communication node 102*n* then combines the route response with the PLI transmission, which is then sent via a flooding protocol or other protocol to be received by to the source communication node 102*l* via the multihop route.

It is too be understood that relay communication nodes 102 may relay (e.g., receive and/or transmit) route requests and route responses, combining them with their respective PLI transmissions if the route request/response is not time critical. For example, a relay communication node 102 tasked with relaying a route request from a source communication node 102*l* or another relay communication node 102 may delay transmitting the route request until the next scheduled PLI transmission, wherein the PLI transmission is combined with the route request. Correspondingly, a relay communication node 102 tasked with relaying a route response from a destination communication node 102*n* or another relay communication node 102 may delay transmitting the route response until the next scheduled PLI transmission, wherein the PLI transmission is combined with the route response. In both examples, the decision to delay relaying the route request/response is dependent on the indication by the route request priority index that is included within the route request.

Figure 6:
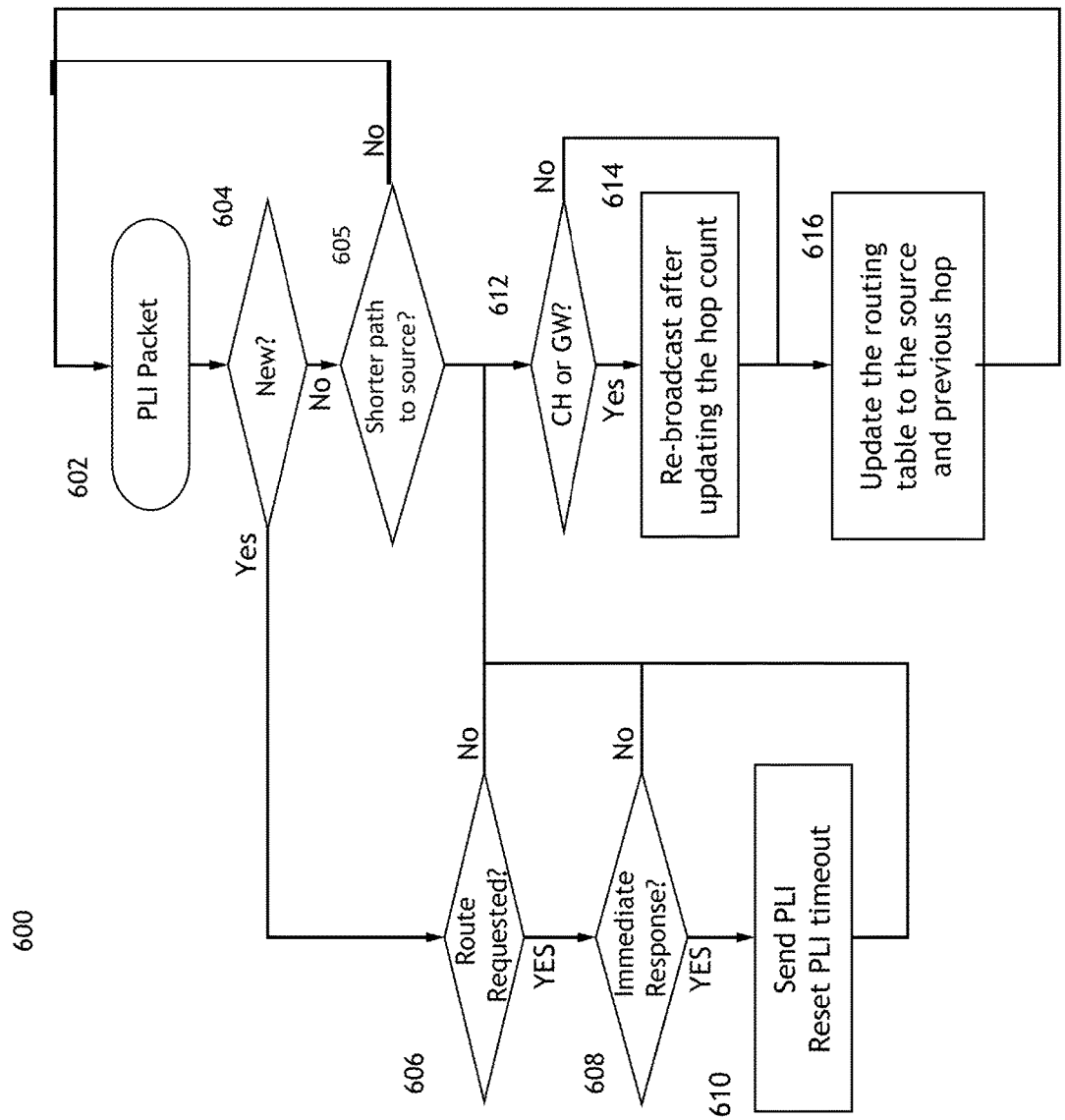
FIG. 6 illustrates a flowchart for handing PLI-containing data packets within a multi-node communication network, in accordance with one or more embodiments of the present disclosure.

FIG. 6 illustrates a flowchart of a method 600 for transmitting a PLI packet within a multi-node communication network 100, in accordance with one or more embodiments of the present disclosure. It is noted herein that the steps of method 600 may be implemented all or in part by multi-node communication network 100 and/or method 200. It is further recognized, however, that the method 600 is not limited to the multi-node communication network 100 and/or method 200 in that additional or alternative system-level embodiments may carry out all or part of the steps of method 600.

In particular, method 600 may illustrate a method carried out by communication nodes 102 of a multi-node communication network 100 to relay PLI packets and route responses, and update routing tables and discovered/recovered routes when a route response is received.

In a step 602, a communication node 102 receives a PLI packet. For example, the relay communication node 102*o* may receive a PLI packet with instructions to send the PLI packet to another communication node 102. It should be understood that that relay communication nodes 102*m* may by themselves combine and transmit PLI transmissions with route requests and/or route responses that they have been tasked for relaying, with the decision to combine PLI transmissions with route request/responses dependent on the indication by the route request priority index.

In a step 604, the controller 104 of the communication node 102 determines whether the PLI packet was received from a newer entry (e.g., new communication node 102). For example, if the relay communication node 102*m* had not previously received a route response from the relay communication node 102*o* (e.g., Step 604="No"), the controller 104*m* of the relay communication node 102*m* may be configured to determine that the relay communication node 102*o* is a new entry. If the controller 104 of the communication node 102 determines that it is not a new entity (e.g., Step 604="No"). then the method proceeds to a step 605.

In a step 605, the controller 104 of the communication node determines if a shorter path exists to the source communication node. For example, the controller 104 of the communication node 102 may access memory 106, comparing a stored path with a routing information included in newly received transmissions. If no shorter path is determined (e.g., Step 605="No"), the PLI packet will be sent to another communication node 102 (e.g., restarting the process at step 602). If a shorter path to the source communication node 102 is determined, then the PLI packet will be sent via the shorter path.

Referring back to step 604, if the controller 104 of the communication node 102 determines it is a new entry (e.g., a new communication node 102 which transmitted the PLI packet in step 604), method 600 proceeds to a step 606. In a step 606, the controller 104 of the communication node 102 determines whether a route request has been received by the communication node 102. For example, the controller 104 may access the memory 106 of the communication node 102 to see if a route request had recently been received. The method 600 then proceeds to step 608.

In a step 608, the controller 104 of the communication node 102 determines if the route request is time critical. For example, the controller may determine that the route request also included a route request priority index indicating that the route request should be transmitted immediately (e.g., Step 608="Yes"). In which case, the method 600 proceeds to a step 610.

In a step 610 the communication node transmits the time critical packet along with the PLI packet via the communication interface 108. For example, the communication interface 108 of the communication node 102 may transmit the PLI packet if the route request priority index indicates that the route response should be transmitted immediately (e.g., Step 608="Yes"). The route response and the PLI packet may then be sent as a combined transmission. In step 610, the controller 104 of the communication node 102 may reset the PLI timer after the PLI packet is sent.

In should be understood that the time critical route response may be sent by itself (without an accompanying PLI packet). For example, the communication relay may be instructed to not prematurely send PLI packets, which would indicate that time critical route responses should be sent without an accompanying PLI packet if a PLI packet is not scheduled to be sent immediately. Therefore, the above description should not be interpreted as a limitation, but rather merely as an illustration If no route request is requested (e.g., Step 606="No") or the route request does not require an immediate response (e.g., Step 608="No") or a shorter path to the source communication node has been identified (e.g., Step 605="Yes), the method 600 proceeds a step 612 of determining if the immediate receiving node is a cluster head node or a gateway node. A cluster head node is the 'head' of all communication nodes 102 within a cluster of nodes that maintains the cluster member table for all information about the members of the cluster. A gateway node is a forwarding communication node which takes packets from cluster heads.

If the PLI-receiving communication node 102 is a cluster head node or a gateway node (e.g., Step 612="yes"), method 600 proceeds to step 614. In step 614, the PLI packet (e.g., including or not including a route response), rebroadcasts (e.g., retransmits) the PLI after updating the hop count. For example, if the PLI packet is transmitted to a cluster head node, the cluster head will update the hop count and retransmit the PLI packet.

If the PLI-receiving communication node is not a cluster head node or gateway node, the method 600 proceeds to a next step 616 of updating the routing table to the source communication node and/or the communication node from the precious hop. For example, the controller 104 of the communication node 102 may update the routing table to the destination communication node stored in memory 106 based on the hop count and unique identifiers within the PLI and/or the route response. In this regard, the communication node 102 may update the routing table to reflect the new route from the source communication node 102*l* to the destination communication node 102*n*. The controller 104 may be further configured to update hop count of and update a time-stamp associated with the updated routing table. The controller 104 may also be further configured to transmit the route response and/or the PLI packet, via communication interface 108, to the next upstream hop along the route to the source communication node 102*l* after updating the hop count to the destination communication node 102*n*. For example, the relay communication node 102*m* may transmit the route response and/or the PLI packet to the communication node 102 (e.g., upstream hop) toward the source communication node 102*l*.

Similarly, if the PLI-receiving communication node 102 is determined to be a cluster head node or a gateway node (e.g., Step 612="Yes") and the route response and/or the PLI packet has been rebroadcast after updating the hope count (e.g., step 614), the method 600 will also proceed to the step 616 of updating the routing table to the source communication table and/or the communication node 102 from the previous hop. Upon sending PLI packets and/or route responses (e.g., Steps 616 and/or 614), the method 600 may then restart at the next communication node (e.g., step 602). If the PLI-receiving communication node 102 is determined to not be a cluster head or gateway node (e.g., Step 612="No"), then the method 600 will skip the step 614 of rebroadcasting after updating the hop count and then proceed to the step 616 of updating the routing table to the source communication table and/or the communication node 102 from the previous hop.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A multi-node communication network comprising:
a source communication node comprising:
    a first communication interface; and
    a first controller communicatively coupled to the first communication interface, wherein the first controller is configured to transmit a data packet comprising:
        a route request; and
        a route request priority index; configured to indicate that a route response is time critical and is combinable with a scheduled position location information (PLI) transmission;
a destination communication node comprising:
    a second communication interface; and
    a second controller communicatively coupled to the second communication interface, the second controller configured to:
        receive the data packet;
        review the route request priority index to determine if the route response is combinable with a PLI transmission; and
        transmit the route response via the second communication interface to the source communication node, wherein the route response is combined with the PLI transmission upon an indication by the route request priority index; and
one or more relay communication nodes comprising:
    a third communication interface; and
    a third controller communicatively coupled to the third communication interface, the third controller configured to relay data packets between the source communication node and the destination communication node wherein the route response is combined with the PLI transmission upon the indication by the route request priority index that the route response is time critical, wherein the route response is transmitted, wherein upon a transmission of the route response a PLI timeout is reset and a routing table is updated.

2. The multi-node communication network of claim 1, wherein the route request priority index is a one-bit flag.

3. The multi-node communication network of claim 1, wherein the second controller is further configured to store a routing table in a memory associated with a route.

4. The multi-node communication network of claim 1, further comprising a memory configured to store a local list of one or more relay communication nodes communicatively coupled to the multi-node communication network.

5. The multi-node communication network of claim 1, wherein the data packet comprises a data transmission between the source communication node and the destination communication node.

6. The multi-node communication network of claim 1, wherein the data packet is transmitted from the source communication node to the destination communication node via at least one of a unicast or multicast method if a route is known.

7. The multi-node communication network of claim 1, wherein the data packet is transmitted from the source communication node to the destination communication node via a flooding procedure if a route is not known.

8. The multi-node communication network of claim 1, wherein the route response is transmitted via a packet flooding procedure.

9. The multi-node communication network of claim 1, wherein the one or more relay communication nodes combines a PLI transmission with at least one of the route request or the route response.

10. The system of claim 8, wherein the packet flooding procedure is performed via a flooding to routing (F2R) method.

11. The system of claim 8, wherein the packet flooding procedure is performed via a zero-overhead flooding (ZOEF) method.

12. A method for transmitting data within a multi-node communication network, comprising:
    transmitting a data packet from a source communication node of a multi-node communication network to a destination communication node, the data packet comprising:
        a route request; and
        a route request priority index; configured to indicate that a route response is time critical and is combinable with a scheduled position location information (PLI) transmission;
    receiving the transmitted data packet transmitted along a route including one or more relay communication nodes with the destination communication node;
    reviewing the route request priority index to determine if the route response is combinable with a scheduled PLI transmission;
    transmitting the route response from the destination communication node to the source communication node; wherein the route response is combined with a PLI transmission upon an indication by the route request priority index that the route response is time critical;
    resetting a PLI timeout; and
    updating a routing table.

13. The method of claim 12, wherein the route request priority index is a one-bit flag.

14. The method of claim 12, wherein the route response is transmitted via a packet flooding procedure.

15. The method of claim 14, wherein the packet flooding procedure is performed via a flooding to routing (F2R) method.

16. The method of claim 14, wherein the packet flooding procedure is performed via a zero-overhead flooding (ZOEF) method.

* * * * *